United States Patent [19]

Yang et al.

[11] Patent Number: 5,763,737
[45] Date of Patent: Jun. 9, 1998

[54] S-(2-DISOPROPYLAMINO) ETHYL METHYLPHONOTHIOATE ION WITH HYDROGEN PEROXIDE

[75] Inventors: Yu-Chu Yang, Bel Air; George W. Wagner, Elkton, both of Md.

[73] Assignee: The United States of America as represented by the Secretary of the Army, Washington, D.C.

[21] Appl. No.: 884,492

[22] Filed: Jun. 27, 1997

[51] Int. Cl.⁶ ............................................. A62D 3/00
[52] U.S. Cl. ........................ 588/218; 562/104; 564/468; 564/500; 588/200
[58] Field of Search .................. 562/104; 564/468, 564/500; 588/200, 218

[56] References Cited

U.S. PATENT DOCUMENTS 5,678,243  10/1997  Yang et al. ..................... 588/244 X

OTHER PUBLICATIONS

Yang, Yu–Chu et al. "Perhydrolysis of Nerve Agent VX" J. Org. Chem. 1993, 58, 6964–6965.

*Primary Examiner*—Michael G. Ambrose
*Attorney, Agent, or Firm*—Ulysses John Biffoni

[57] ABSTRACT

A method for the reduction of toxicity of S-(2-diisopropylamino)ethyl methylphosphonothioate ions in a medium or mixture by reaction with hydrogen peroxide and a strong inorganic acid.

22 Claims, 1 Drawing Sheet

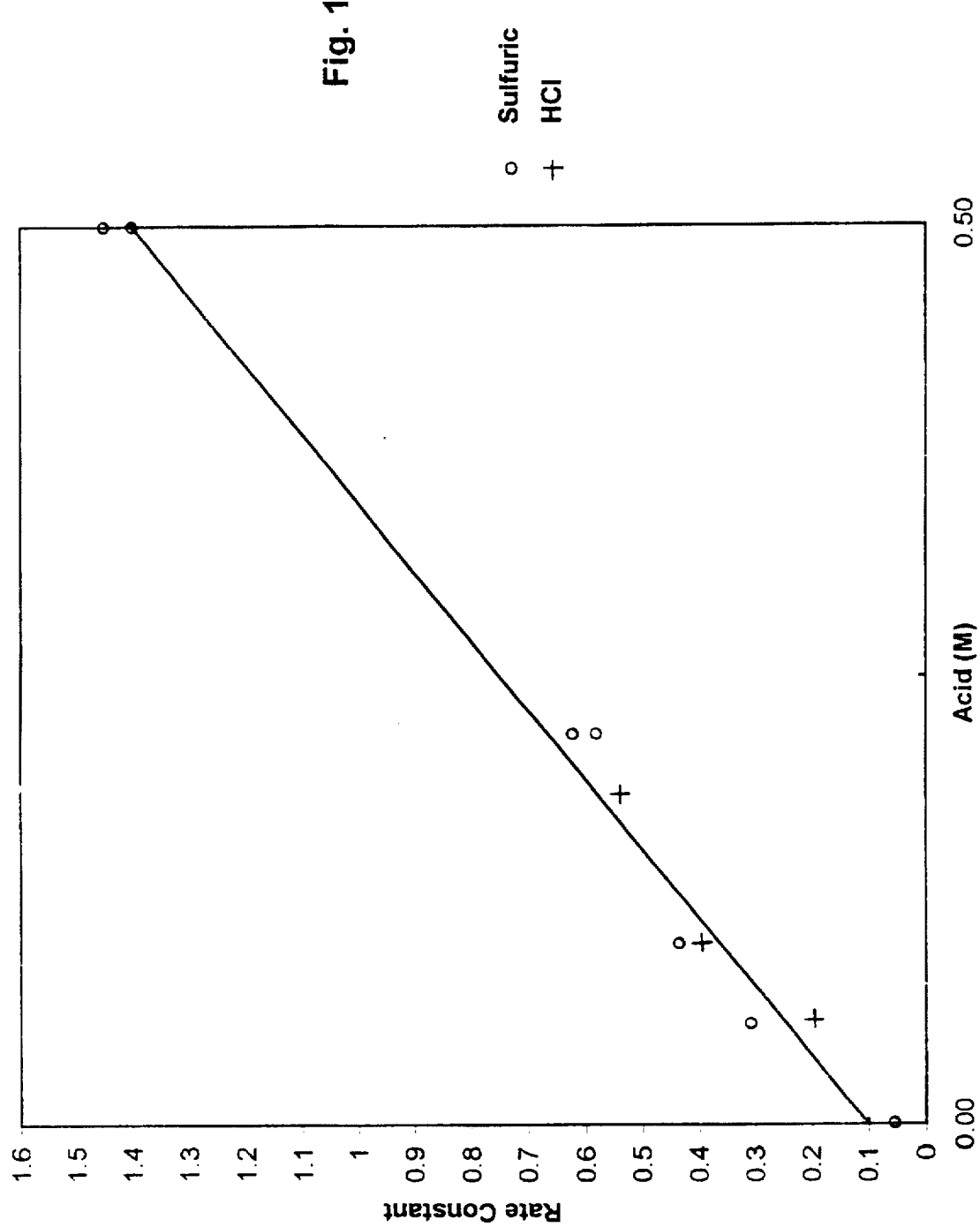

S-(2-DISOPROPYLAMINO) ETHYL METHYLPHONOTHIOATE ION WITH HYDROGEN PEROXIDE

BACKGROUND OF THE INVENTION

1. Field of the Invention

The present invention relates to a method for the reduction in toxicity of S-(2-diisopropylamino)ethyl methylphosphonothioate ions. More particularly, the invention pertains to a means of reducing the toxicity of S-(2-diisopropylamino)ethyl methylphosphonothioate ions by means of acidified hydrogen peroxide.

2. Description of the Prior Art

Phosphonothiolates are highly toxic chemical warfare nerve agents first synthesized in the mid 1950's and currently stockpiled by various governments. The most commonly known of these nerve agents is O-ethyl S-(2-diisopropylamino)ethyl methylphosphonothliolate which is known as VX. Methods used over the years to decontaminate such agents as VX have each had problems associated with them such as low solubility of the agent, toxicity, corrosiveness, hazardous reaction products or the generation of large amounts of waste products. One of the waste products formed during the destruction of VX is S-(2-diisopropylamino)ethyl methylphosphonothioate ion, also known as EA-2192. Most of the toxic organophosphorus esters can be detoxified by hydrolysis in alkaline solutions. See O'Brien, R. D., Toxic Phosphorus Esters; Academic Press, London, 1960, Chapter 2; and Jenks, W. P., et al, J. Am. Chem. Soc. 1964, 86, pgs. 5616–5620. These methods, however, fail to adequately detoxify the S-(2-diisopropylamino)ethyl methylphosphonothioate ion, which is a potentially-persistent VX-derived ground-water contaminant. The standard Army decontaminant, DS2 (70% diethylenetriamine, 28% ethylene glycol monomethyl ether, 2% NaOH, by weight) is used to detoxify VX under combat conditions. While extremely effective at destroying the agent via nucleolphilic substitution using alkoxide ion, DS2 has deleterious effects on many materials. See Beaudry, W. T., et al "Reactions of Chemical Warfare Agents with DS2: Product Identification by NMR. I. Organophosphorus Compounds". CRDEC-TR-364, Jun. 1992. In addition, because of its corrosive nature on exposure to air, DS2 is considered to be a hazardous material, and any resulting solutions are classified as hazardous waste and must be regulated in accordance with the Resource Conservation and Recovery Act. Consequently, the use of DS2 to detoxify small quantities of VX as well as its use in the large-scale demilitarization of leaking and/or obsolete agent-filled munitions is undesirable since it would generate large quantities of regulated hazardous waste.

The destruction of dangerous VX results in an abundance of undesirable hazardous waste products such as S-(2-diisopropylamino)ethyl methylphosponothioate ions. Therefore, it would be desirable to devise a new method which is capable of reducing the toxicity of S-(2-diisopropylamino)ethyl methylphosphonothioate ions in a given medium.

It is known in the art that hydrolysis is not very effective for the detoxification of S-(2-diisopropylamino)ethyl methylphosphonothioate ions as they react very slowly with hydroxide. Perhydrolysis occurs somewhat faster, but peroxide decomposes under basic conditions, rendering this method unsuitable. It is also well known that sulfides are oxidized by hydrogen peroxide to yield sulfoxides and sulfones, and that strong acids catalyze the reaction. It has now been found that, while not a conventional sulfide, S-(2-diisopropylamino)ethyl methylphosphonothioate ions do contain a potentially oxidizable sulfur which may aid in its detoxification.

SUMMARY OF THE INVENTION

The invention provides a method of reducing the toxicity of S-(2-diisopropylamino)ethyl methylphosphonothioate ions which comprises contacting a medium containing S-(2-diisopropylamino)ethyl methylphosphonothioate ions with a sufficient amount of $H_2O_2$ and a strong inorganic acid under conditions sufficient to produce a reaction product having less toxicity than the S-(2-diisopropylamino)ethyl methylphosphonothioate ions.

BRIEF DESCRIPTION OF THE DRAWINGS

FIG. 1 shows a plot of rate constants vs. added acid concentration for the oxidation of 0.1MEA-2192 in water by 15% $H_2O_2$ at 23° C.

DETAILED DESCRIPTION OF THE PREFERRED EMBODIMENT

The invention provides a method for reducing the toxicity of S-(2-diisopropylamino)ethyl methylphosphonothioate ions which are present in a medium, by contacting the ion-containing medium with sufficient hydrogen peroxide in the presence of a strong inorganic acid. In the usual case, the medium comprises water.

In the preferred embodiment, the S-(2-diisopropylamino) ethyl methylphosphonothioate ions exist as a component in a mixture which may include, but is not limited to, water, including sea water, (2-diisopropylamino)ethyl methyl phosphonic acid, water/VX matrix, and other impurities.

In the usual case, the S-(2-diisopropylamino)ethyl methylphosphonothioate ion concentration in this mixture is present in an amount from about 0. 1% to about 2.0% of the mixture, or more usually from about 0.1% to about 0.4% of the mixture.

In the preferred embodiment, the $H_2O_2$ component is added as a 30% aqueous solution to the S-(2-diisopropylamino)ethyl methylphosphonothioate ion mixture, although the peroxide may also be generated in situ by other compounds such as an aqueous percarbonate such as sodium percarbonate or aqueous perborate such as sodium perborate.

The volume ratio of the S-(2-diisopropylamino)ethyl methylphosphonothioate ion containing mixture to the 30% $H_2O_2$ is preferred to be from about 1:1 to about 1:10, most preferably from about 1:1 to about 1:5. If the $H_2O_2$ is employed at a concentration other than 30%, these quantities must be appropriately adjusted.

The acid component is preferred to be a strong inorganic acid, which may be but is not limited to hydrochloric, sulfonic, phosphoric, nitric, and acetic acids. The acid component is added to the medium containing the S-(2-diisopropylamino)ethyl methylphosphonothioate ion mixture and the $H_2O_2$ component in such an amount that the resulting new mixture preferably has an acid generated proton concentration of from about 0.1M to about 1.0M.

Once the peroxide and acid are added to the ion containing mixture, the reaction is run from about 3 days to about 10 days, most preferably from about 3 days to about 4 days, with optional gentle stirring. The reaction preferably takes place at a temperature of about 70° C. or below, more preferably from about 0° C. to about 70° C., most preferably from about 15° C. to about 35° C.

The resulting reaction product has a toxicity which is less than that of the starting S-(2-diisopropylamino)ethyl methylphosphonothioate ions.

The following non-limiting examples serve to illustrate the invention.

EXAMPLE

In this example, methods for the reduction in toxicity of S-(2-diisopropylamino)ethyl methylphosphonothioate ions in both water and the $VX/H_2O$ matrix are evaluated.

Analytical Method

S-(2-diisopropylamino)ethyl methylphosphonothioate ions and products were monitored in situ by $^{31}P$ NMR using a Varian INOVA200NMR spectrometer. Product identification was also aided by $^{13}C$ NMR. The observation frequencies for $^{31}P$ and $^{13}C$ were 81 and 50 MHZ, respectively. Spectra were acquired at either 23° or 35° C., and proton decoupling was employed. Chemical shifts were referenced to external either 85% $H_2PO_4$, or tetramethylsilane. The extent of reaction was determined using the $^{31}P$ NMR peak areas.

S-(2-diisopropylamino)ethyl methylphosphonothioate ions in Water

For each experiment, an appropriate amount of aqueous 0.2M S-(2-diisopropylamino)ethyl methylphosphonothioate ion was added to a 5 mm NMR tube containing appropriate amounts of water, 30% hydrogen peroxide, and either hydrochloric or sulfuric acid. The tube was capped and shaken to mix the solution. The reaction was monitored by $^3P$ NMR. The two products initially observed by NMR were methylphosphonic acid (MPA) and (2-diisopropylamino)ethyl disulfide (RSSR). The RSSR slowly oxidized further to (2-diisopropylamino)ethyl sulfonic acid ($RSO_3H$) where R=-$CH_2CH_2N$(isopropyl)$_2$.

Initial rate constants obtained for the oxidation of 0.1M S-(2-diisopropylamino)ethyl methylphosphonothioate ion by 15% $H_2O_2$ at 23° C. in the presence of various acids are plotted in FIG. 1. The rate constants increase linearly with acid concentration. The rate enhancements are identical for the strong acids, $H_2SO_4$ and HCl. The half-life of S-(2-diisopropylamino)ethyl methylphosphonothioate ion is 14.5 h in neutral 15% $H_2O_2$ (5.0 h at 35° C., $E_a$ =16 kcal-mol$^{-1}$) and only 31 min with either 0.5M $H_2SO_4$ or HCl. The second-order rate constants are 2.5 $M^{-1}h^{-1}$ for both $H_2SO_4$ and HCl as indicated by the slope of the line (least squares) when plotting Rate constant($h^{-1}$) versus Acid concentration (M) for $H_2SO_4$ and HCl.

Rate Inhibition

The rate constants for the acid-catalyzed S-(2-diisopropylamino)ethyl methylphosphonothioate ion oxidations are obtained from initial rates because deviations from first-order behavior occurred after about 1 half-life. The reaction was confirmed to be first-order in [S-(2-diisopropylamino)ethyl methylphosphonothioate ion] by a series of experiments with 0.01, 0.02, 0.05, and 0.1M S-(2-diisopropylamino)ethyl methylphosphonothioate ions, and 15% $H_2O_2$ and 0.5M $H_2SO_4$, all of which yielded the same initial rate constant. Rate inhibition was not evident in neutral $H_2O_2$, and was much less pronounced at the lower S-(2-diisopropylamino)ethyl methylphosphonothioate ion concentrations examined. $H_2O_2$ consumption is not responsible for the inhibition since it is in large excess (15% or 4.5M). Also, titration of the $H_2O_2$ under reaction conditions (0.1M S-(2-diisopropylamino)ethyl methylphosphonothioate ion, 15% $H_2O_2$, 0.25M $H_2SO_4$) shows that it remained constant for several S-(2-diisopropylamino)ethyl methylphosphonothioate ion half-lives: 13.8% $H_2O_2$ at t=2 min and 13.5% $H_2O_2$ at t=7.5 h. The fact that the inhibition is only observed during acid-catalyzed oxidations and at large (0.1M) S-(2-diisopropylamino)ethyl methylphosphonothioate ion is consistent with RSSR product inhibition. The liberated RSSR is apparently protonated to a greater extent than S-(2-diisopropylamino)ethyl methylphosphonothioate ion; thus, acid is consumed in the reaction. In a reaction run with 0.01M S-(2-diisopropylamino)ethyl methylphosphonothioate ion 0.045M RSSR, 15% $H_2O_2$, and 0.1M HCl yielded $t_{1/2}$=4.0 h, much longer than the 1.9 h half-live observed for the analogous reaction without added RSSR (0.1M S-(2-diisopropylamino)ethyl methylphosphonothioate ion, 15% $H_2O_2$ 0.1M HCl). Similar experiments with MPA showed no inhibition attributable to this product.

S-(2-diisopropylamino)ethyl methylphosphonothioate ion in $VX/H_2O$ Matrix

For each experiment, 0.1 ml $VX/H_2O$ product was added to a 5 mm NMR tube containing 0.5 ml 30% $H_2O_2$ and the appropriate amount of sulfuric acid. The resulting solution contained 2.3 mM S-(2-diisopropylamino)ethyl methylphosphonothioate ion and 25% $H_2O_2$. The tube was capped and shaken to mix the solution. The reaction was monitored by $^{31}P$ NMR.

The major components of the $VX/H_2O$ product are ethyl methylphosphonic acid (EMPA) and (2-diisopropylamino) ethanethiol (RSH). Addition of the VX/H2O product to $H_2O_2$ results in the immediate oxidation of RSH to RSSR. S-(2-diisopropylamino)ethyl methylphosphonothioate ion affords the same products as in water. Rate constants obtained at 23° C. for various concentrations of added $H_2SO_4$ were plotted. At 23° C., the half-life of S-(2-diisopropylamino)ethyl methylphosphonothioate ion is about 8 h without added acid (3.3 h at 35° C., $E_a$=14 kcal-mol$^{-1}$), and 5.1 h and 3.9 h with 0.05M and 0.125M $H_2SO_4$, respectively. The second order rate constant is 0.73 $M^{-1}h^{-1}$, much smaller than the corresponding $H_2SO_4$ and HCl catalyzed oxidations(2.5 $M^{-1}h^{-1}$). This diminished rate enhancement is consistent with the significant basicity of the large amount of RSSR that immediately forms from the RSH in the $VX/H_2O$ product. But, unlike the case for S-(2-diisopropylamino)ethyl methylphosphonothioate ion in water, the amount of RSSR does not increase significantly as the reaction of S-(2-diisopropylamino)ethyl methylphosphonothioate ion progresses and the acid-catalyzed oxidations do not deviate from first-order behavior.

In the absence of added acid, the oxidation of S-(2-diisopropylamino)ethyl methylphosphonothioate ion in $VX/H_2O$ is considerably faster than in neutral water, which is partially ascribable to the inherent acidity from the EMPA in $VX/H_2O$. pH measurements for $VX/H_2O$ in water, and during oxidation in 30% $H_2O_2$, are 4.52 (1:5 in water, t=16 min), 3.52 (1:5 in 30% $H_2O_2$, t=10 min), and 1.23 (1:5 in 30% $H_2O_2$, t=9 days). During oxidation, additional acidic products are produced (e.g. $RSO_3H$) which lowers the pH further. This increased acidity would serve to increase the rate of S-(2-diisopropylamino)ethyl methylphosphonothioate ion oxidation at extended reaction times, hastening and ensuring reaction completion. Rate constants ($h^{-1}$) were plotted versus added $H_2SO_4$ concentration (M) for the oxidation of native S-(2-diisopropylamino)ethyl methylphosphonothioate ion in the $VX/H_2O$ product by 25% $H_2O_2$ at 23° C.

Conclusions

Strong acids catalyze the $H_2O_2$ oxidation of S-(2-diisopropylamino)ethyl methylphosphonothioate ion in water and in the $VX/H_2O$ matrix. In water, deviation from first-order kinetics is observed and attributed to inhibition by the RSSR product. In VX/H$_2$O, the large amount of RSSR that initially forms also appears to be inhibiting acid-catalysis. However, first-order kinetics is still observed for S-(2-diisopropylamino)ethyl methylphosphonothioate ion as concentration of RSSR remains constant.

What is claimed is:

1. A method of reducing the toxicity of S-(2-diisopropylamino)ethyl methylphosphonothioate ion which comprises reacting a mixture comprising a medium and S-(2-diisopropylamino)ethyl methylphosphonothioate ions with a sufficient amount of H$_2$O$_2$ and a strong inorganic acid under conditions sufficient to produce a reaction product having substantially less toxicity than the S-(2-diisopropylamino)ethyl methylphosphonothioate ions.

2. The method of claim 1, wherein said medium comprises water.

3. The method of claim 1, wherein said medium comprises an aqueous mixture of O-ethyl S-(2-diisopropylamino)ethyl methylphosphonothiolate.

4. The method of claim 1, wherein said S-(2-diisopropylamino)ethyl methylphosphonothioate ions are present in the mixture at from about 0.1% to about 2.0% of the mixture.

5. The method of claim 1, wherein said H$_2$O$_2$ is added at an aqueous concentration of from about 15% to about 30%.

6. The method of claim 1, wherein said H$_2$O$_2$ is added at an aqueous concentration of about 30%.

7. The method of claim 1, wherein said S-(2-diisopropylamino)ethyl methylphosphonothioate ion mixture and said H$_2$O$_2$ are reacted at volume ratios ranging from about 1:1 to about 1:10.

8. The method of claim 1, wherein said acid is selected from the group consisting of hydrochloric, sulfonic, phosphoric, and nitric acids.

9. The method of claim 1, wherein said acid is present in an amount such that the acid generated protons are at a concentration of from about 0.1M to about 1.0M.

10. The method of claim 1, wherein said reaction is allowed to proceed for a period of from about 3 days to about 10 days.

11. The method of claim 1, wherein said reaction is allowed to proceed for a period of from about 3 days to about 4 days.

12. The method of claim 1, wherein said reaction occurs at temperature ranges from about 0° C. to about 70° C.

13. The method of claim 1, wherein said reaction occurs at temperature ranges from about 15° C. to about 35° C.

14. The method of claim 1, wherein the S-(2-diisopropylamino)ethyl methylphosphonothioate ions present in the medium result from the hydrolysis of O-ethyl S-(2-diisopropylamino)ethyl methylphosphonothioate with a stoichiometric amount of water.

15. The method of claim 14, wherein said S-(2-diisopropylamino)ethyl methylphosphonothioate ions are present in the mixture at from about 0.1% to about 2.0% of the mixture.

16. The method of claim 14, wherein said H$_2$O$_2$ is added at an aqueous concentration of about 30%.

17. The method of claim 14, wherein said S-(2-diisopropylamino)ethyl methylphosphonothioate ion mixture and said H$_2$O$_2$ are reacted at volume ratios ranging from about 1:1 to about 1:10.

18. The method of claim 14, wherein said acid is selected from the group consisting of hydrochloric, sulfonic, phosphoric, nitric, and acetic acids.

19. The method of claim 14, wherein said acid is present in an amount such that the acid generated protons are at a concentration of from about 0.1M to about 1.0M.

20. The method of claim 14, wherein said reaction is allowed to proceed for a period of from about 3 days to about 10 days.

21. The method of claim 14 wherein said reaction occurs at temperature ranges from about 0° C. to about 70° C.

22. A method of reducing the toxicity of S-(2-diisopropylamino)ethyl methylphosphonothioate ions which comprises reacting a mixture comprising a medium and S-(2-diisopropylamino)ethyl methylphosphonothioate ions with a sufficient amount of H$_2$O$_2$ and acetic acid under conditions sufficient to produce a reaction product having substantially less toxicity than the S-(2-diisopropylamino) ethyl methylphosphonothioate ions.

* * * * *

UNITED STATES PATENT AND TRADEMARK OFFICE
CERTIFICATE OF CORRECTION

PATENT NO    :   5,763,737
DATED        :   Jun 9, 1998
INVENTOR(S): Yu-Chu Yang, George W. Wagner It is certified that error appears in the above-identified patent and that said Letters Patent is hereby corrected as shown below:

Title of the Invention should read: " ACID-CATALYZED OXIDATION OF S-(2-DIISOPROPYLAMINO) ETHYL METHYLPHOSPHONOTHIOATE ION WITH HYDROGEN PEROXIDE"

Signed and Sealed this

Third Day of November, 1998

*Attest:*

BRUCE LEHMAN

*Attesting Officer*    Commissioner of Patents and Trademarks